United States Patent
Mueller et al.

(10) Patent No.: US 8,220,255 B2
(45) Date of Patent: Jul. 17, 2012

(54) DRIVE HAVING AN ENERGY RECOVERY FUNCTION HAVING A BRAKE PRESSURE CONTROL VALVE

(75) Inventors: Matthias Mueller, Neusaess (DE); Georg Rausch, Lohr am Main (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 788 days.

(21) Appl. No.: 12/305,307

(22) PCT Filed: Jun. 20, 2007

(86) PCT No.: PCT/EP2007/005443
§ 371 (c)(1),
(2), (4) Date: Dec. 17, 2008

(87) PCT Pub. No.: WO2007/147583
PCT Pub. Date: Dec. 27, 2007

(65) Prior Publication Data
US 2010/0000210 A1    Jan. 7, 2010

(30) Foreign Application Priority Data

Jun. 20, 2006 (DE) .......................... 10 2006 028 346
Sep. 6, 2006 (DE) .......................... 10 2006 041 823

(51) Int. Cl.
*B60T 1/093* (2006.01)
*B60T 1/10* (2006.01)

(52) U.S. Cl. ....................................................... 60/414

(58) Field of Classification Search ..................... 60/413, 60/414
See application file for complete search history.

(56) References Cited

U.S. PATENT DOCUMENTS

| | | | |
|---|---|---|---|
| 5,050,936 A * | 9/1991 | Tanaka et al. | 180/165 |
| 5,799,562 A | 9/1998 | Weinberg | |
| 6,712,166 B2 | 3/2004 | Rush et al. | |
| 7,082,757 B2 * | 8/2006 | Teslak et al. | 60/414 |
| 2001/0047654 A1 | 12/2001 | Rush et al. | |
| 2005/0016168 A1 * | 1/2005 | Singh | 60/413 |

FOREIGN PATENT DOCUMENTS

| | | |
|---|---|---|
| DE | 197 35 287 A1 | 2/1999 |
| DE | 199 30 997 B4 | 5/2000 |
| DE | 10 2005 027 931 A1 | 1/2006 |
| EP | 0 366 088 A2 | 5/1990 |
| WO | WO 87/01993 | 4/1987 |

* cited by examiner

*Primary Examiner* — Thomas E Lazo
(74) *Attorney, Agent, or Firm* — Scully, Scott, Murphy & Presser, P.C.

(57) ABSTRACT

The invention relates to a drive (1) having an energy recovery function. The drive having an energy recovery function comprises a hydrostatic piston machine (9) and at least one storage element (13) which is connected to said hydrostatic piston machine. Said hydrostatic piston machine (9) and the at least one storage element (13) are connected together by means of a storage line. Said storage line is divided into a first storage line section (11) and into a second storage line section (12) by a throttle value unit (15). Said throttle valve unit (15) comprises a control pressure valve unit (16) and a built-in valve (17). The control pressure valve unit (16) produces a control pressure which acts upon the built-in valve (17).

9 Claims, 2 Drawing Sheets

DRIVE HAVING AN ENERGY RECOVERY FUNCTION HAVING A BRAKE PRESSURE CONTROL VALVE

BACKGROUND

The invention relates to a drive having an energy recovery function.

A drive having an energy recovery function is known from U.S. Pat. No. 6,712,166 B2. In the system proposed therein, pressure medium is conveyed on the one hand from a reservoir into a pressure store by a pump/motor arrangement as long as the pump/motor arrangement is driven by the mass inertia of the vehicle during a deceleration operation. In order to then also allow the vehicle to be braked by means of the hydrostatic drive, when the capacity limit of the pressure stores is reached, there is provision in the drive proposed therein to produce a flow resistance with the storage elements being bypassed and to convey pressure medium in a closed circuit by the pump/motor arrangement.

The system proposed therein has the disadvantage that a change-over is carried out from the store to the additional closed circuit when the storage elements have reached the capacity limit thereof and consequently can no longer be used for storing pressure energy whilst performing braking operations. The throttling is carried out in an additional circuit. However, it is not known from U.S. Pat. No. 6,712,166 B2 to provide a throttle valve unit which allows a throttle function in a store line between the pump/motor arrangement and the storage element. The provision of the two separate functions which must be linked to each other in a complex control system not only requires considerable adaptation work but also requires a significant level of structural complexity. This leads to high costs and the additional mechanical components which are required.

SUMMARY

The object of the invention is to provide a drive having an energy recovery function which, in addition to the braking power owing to the storage of energy, provides a controllable flow resistance for the hydrostatic piston engine which is operated as a pump.

According to one aspect of the present invention, the drive having an energy recovery function has a hydrostatic piston engine and at least one storage element which is connected thereto. The piston engine and the storage element are connected to each other by means of a store line. The store line is divided by a throttle valve unit into a first store line portion and a second store line portion. The throttle valve unit comprises a control pressure valve unit and an integrated valve, a control pressure which is adjusted by the control pressure valve unit acting on the integrated valve and thus allowing a variable throttling of the volume flow between the hydrostatic piston engine and the storage element.

According to claim 1, the drive having an energy recovery function has a hydrostatic piston engine and at least one storage element which is connected thereto. The piston engine and the storage element are connected to each other by means of a store line. The store line is divided by a throttle valve unit into a first store line portion and a second store line portion. The throttle valve unit comprises a control pressure valve unit and an integrated valve, a control pressure which is adjusted by the control pressure valve unit acting on the integrated valve and thus allowing a variable throttling of the volume flow between the hydrostatic piston engine and the storage element.

The hydrostatic drive according to the invention has the advantage that the level of line complexity is low and in particular, even with the pressure store in a state of low charge, a high level of braking action is already enabled. In contrast to the drive known from the prior art, it is possible in this instance to increase the flow resistance, against which the hydrostatic piston engine conveys, using the throttle valve unit. This is necessary in particular when the pressure stores are still empty and therefore do not produce sufficient flow resistance. Owing to the provision of a control pressure using the control pressure valve unit, a simple integrated valve can be used to throttle the volume flow in the store line. The use of the control pressure as an adjustment value for the integrated valve further has the advantage that high forces can be produced at the valve and allow a rapid reaction.

In particular it is advantageous, on the one hand, to allow the control pressure to act on the integrated valve in one direction and, on the other hand, in the opposite direction, the supply pressure of the hydrostatic piston engine and the store pressure in the storage element. Depending on the control pressure produced by the control pressure valve unit, a constant counter-pressure is consequently established for the hydrostatic piston engine. Consequently, in particular as claimed according to a further preferred configuration, when an electrically activated pressure limitation valve is used to produce the control pressure, the counter-pressure for the hydrostatic piston engine can be adjusted in a simple manner. The control can then also advantageously be carried out by means of an electronic control unit which, in addition to the current travel status, can also take into account data entered by a user, such as, for example, brake pedal position or the like.

Furthermore, it is advantageous to supply the control pressure valve unit from a pressure medium source via a control pressure supply line and to depressurise this control pressure supply line into a tank volume via the pressure limitation valve. The adjustment is therefore carried out by discharging pressure from the control pressure supply line. In particular, the control pressure supply line can advantageously be connected to a supply-side connection of the hydrostatic piston engine by means of a throttle. According to another particularly preferred configuration, the connection of the control pressure supply line to the supply-side connection of the hydrostatic piston engine is carried out by means of a shuttle valve. Depending on the pressure relationships at the supply-side outlet of the hydrostatic piston engine and in the storage element, the control pressure supply line is connected either to the supply-side connection of the hydrostatic piston engine or to the storage element by the shuttle valve.

In order to prevent leakage through the electrically controllable pressure limitation valve, a switching valve is preferably arranged in the control pressure supply line upstream of the pressure limitation valve. The switching valve is also preferably electrically activated and is used to interrupt the control pressure supply line. A leakage through the pressure limitation valve which is arranged downstream is thus prevented.

In order to produce a control signal for the pressure limitation valve which is itself provided to produce the control pressure, an electronic control unit is preferably provided by means of which the pressure limitation valve can be electromagnetically controlled. The electronic control unit is connected, at the input side, to a pressure sensor which transmits a pressure value to the electronic control unit. The control signal is established by the electronic control unit in accordance with this measured pressure value and a desired pressure value which can be predetermined. The measured pressure value may be either, in the case of an adjustment of the integrated valve, the pressure produced at the supply-side connection of the hydrostatic piston engine or, if the integrated valve is controlled, the pressure in the storage element.

The integrated valve is preferably constructed in such a manner that it is acted on in the closing direction by the control pressure and a resilient force which acts in the same direction. In a manner already set out above, both the supply pressure of the hydrostatic piston engine and the store pressure of the storage element act in the opposite direction.

BRIEF DESCRIPTION OF THE DRAWINGS

Preferred configurations of the drive according to the invention are illustrated in the drawings and are explained in greater detail in the following description.

DETAILED DESCRIPTION OF EXEMPLARY EMBODIMENTS

Figure 1:
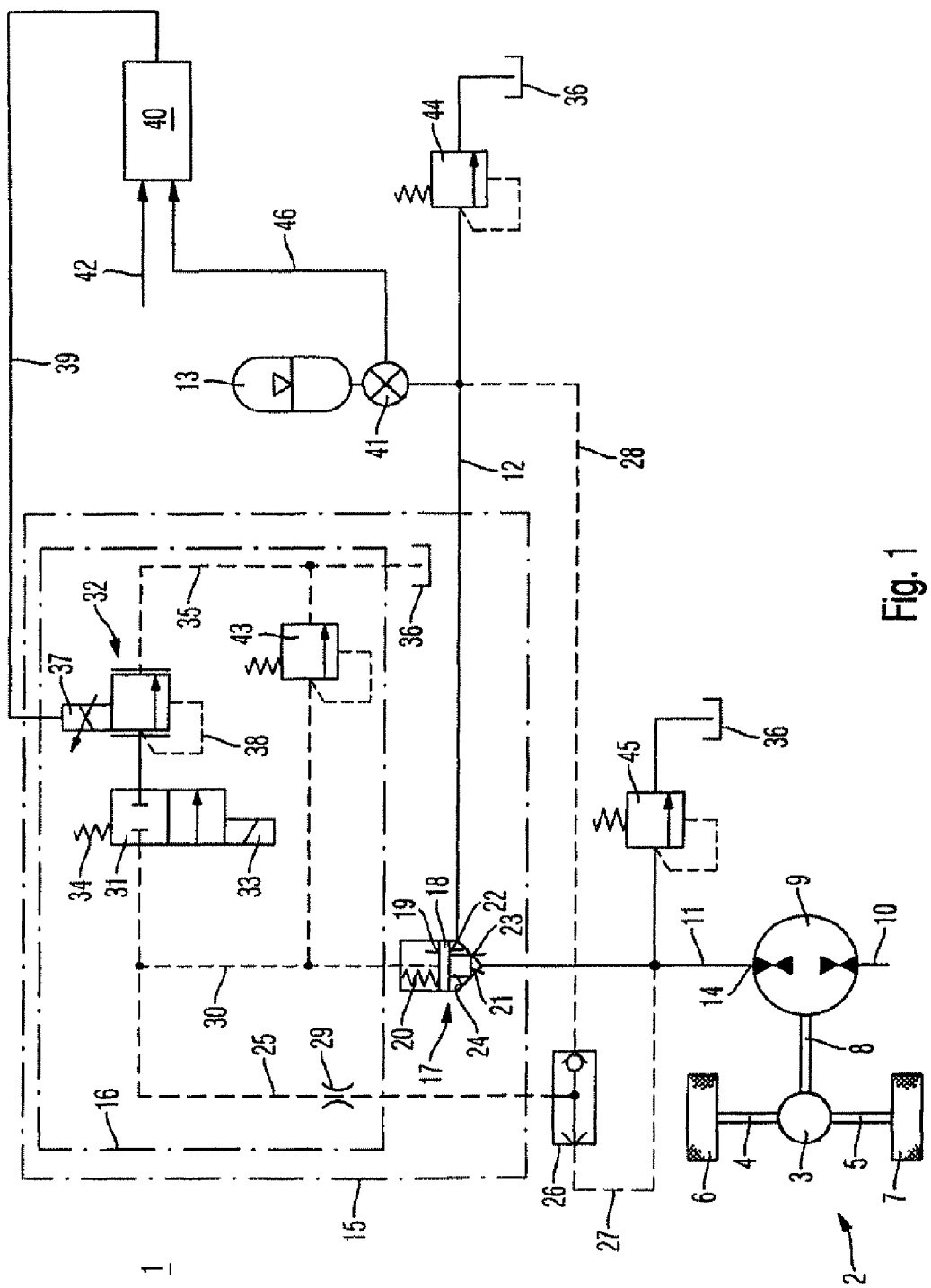
FIG. 1 is a first embodiment of a drive according to the invention.

FIG. 1 is a hydraulic circuit diagram of a first embodiment of a drive 1 having an energy recovery function. In the embodiment illustrated, the drive 1 is provided for energy recovery in a travel drive 2, for example, of a refuse collection vehicle or a fork lift truck. Such vehicles have intensive travel cycles, that is to say, braking and acceleration operations often closely follow each other.

The travel drive 2 comprises a differential 3 which acts on a first driven wheel 6 and a second driven wheel 7 by means of a first half-shaft 4 and a second half-shaft 5. The differential 3 is connected to a hydrostatic piston engine 9 by means of an output shaft 8. Further components which belong to the travel drive 2 are not illustrated in the drawings for reasons of clarity. The hydrostatic piston engine 9 may be either a separate piston engine which is used exclusively for energy recovery, or a hydraulic motor of a hydrostatic travel drive. The coupling to the differential 3 of the travel drive 2 by means of an output shaft 8 is also intended to be understood purely by way of example.

The hydrostatic piston engine 9 is connected to a pressure medium reservoir by means of an intake line 10. In the most simple case, a pressure-free tank volume acts as a pressure medium reservoir. Alternatively, it is also possible to provide a hydraulic store as a pressure medium reservoir. In order to store kinetic energy during a braking operation, the hydrostatic piston engine 9 is operated as a pump owing to the mass inertia of the driven vehicle so that the hydrostatic piston engine 9 draws pressure medium from the pressure medium reservoir via the intake line 10. The hydrostatic piston engine 9 conveys this pressure medium into a store line which is connected to the supply-side connection 14 thereof. The store line connects the hydrostatic piston engine 9 to a storage element 13. The storage element 13 is, for example, a hydraulic membrane store. In particular, the storage element 13 is a high-pressure store.

The store line comprises a first store line portion 11 and a second store line portion 12. The first store line portion 11 and the second store line portion 12 can be connected to each other by means of a throttle valve unit 15.

The throttle valve unit 15 comprises a control pressure valve unit 16 in order to produce a control pressure. The control pressure provided by the control pressure valve unit 16 acts on an integrated valve 17. The integrated valve 17 is constructed as a seat valve in the embodiment illustrated. A valve piston 18 is arranged so as to be able to be longitudinally displaced in the integrated valve 17. The valve piston 18 has a control pressure face 19 on which the valve piston 18 is acted with a hydraulic force by the control pressure. In the same direction, the force of a valve spring 20 acts on the valve piston 18. In the opposite direction, the sum of two hydraulic forces which is produced by the pressures in the first store line portion 11 and the second store line portion 12 acts on the valve piston 18. To this end, the valve piston 18 has a first face 21 which can be acted on with pressure and a second face 22 which can be acted on with pressure. The first and the second faces 21, 22 which can be acted on with pressure are formed on the valve piston 18 by means of a stepped geometry of the valve piston 18. The valve piston 18 which is preferably constructed in a rotationally symmetrical manner has, at the transition from the first face 21 which can be acted on with pressure to the second face 22 which can be acted on with pressure, a sealing edge 23 which co-operates in a sealing manner with a sealing seat 24 as long as the integrated valve 17 is in the closed position thereof. Owing to the valve spring 20, the valve piston 18 is retained in a pressure-free state in the closed position thereof.

In order to produce a control pressure at the control pressure face 19, a control pressure supply line 25 is connected to a shuttle valve 26. The shuttle valve 26 connects the control pressure supply line 25 either to a supply pressure branch line 27 or to a store pressure branch line 28 as a pressure medium source. Depending on the pressures in the supply pressure branch line 27 and the store pressure branch line 28, the control pressure supply line 25 is connected in each case to the line which has the greater pressure. A throttle 29 which is fixedly set or can be adjusted is preferably arranged within the control pressure valve unit 16 in the control pressure supply line 25.

The control pressure supply line 25 is connected to the integrated valve 17 by means of a connection line 30 so that the pressure in the control pressure supply line 25 is supplied to the control pressure face 19 and acts on the valve piston 18 with a hydraulic force in the closing direction. In order to adjust the level of the pressure in the control pressure supply line 25, a switching valve 31 and a controllable pressure limitation valve 32 are arranged in the control pressure supply line 25. Using the switching valve 31, with appropriate activation of an electromagnet 33, the connection from the control pressure supply line 25 to the pressure limitation valve 32 can be completely disengaged in order to prevent a leakage flow through the pressure limitation valve 32. In the idle position thereof, the switching valve 31 is acted on in the direction of this opened position by a pressure spring 34. If the level of the control pressure in the control pressure supply line 25 is intended to be adjusted by the pressure limitation valve 32, which is constructed so as to be adjustable, the electromagnet 33 is activated. When the electromagnet 33 is supplied with electrical power, the switching valve 31 is moved into the second switching position thereof in which a connection through which fluid can flow is produced from the control pressure supply line 25 to the pressure limitation valve 32.

The pressure limitation valve 32 can be controlled by means of an electromagnet 37. The electromagnet 37 is preferably a proportional magnet which is acted on with a control signal, whereby the opening pressure of the pressure limitation valve 32 is adjusted. Counter to the force of the electromagnet 37, there acts on the pressure limitation valve 32 a hydraulic force which is produced on a measuring face by an input pressure of the pressure limitation valve 32 which is supplied by means of a measuring line 38. The input pressure corresponds to the pressure of the control pressure supply line 25 when the switching valve 31 is open. If this hydraulic force which is produced by the pressure supplied from the input side of the pressure limitation valve 32 exceeds the force of the electromagnet 37 acting in the opposite direction, the pressure limitation valve 32 is displaced in the direction of the open position thereof In the open position of the pressure limitation valve 32, the control pressure supply line 25 is connected to a depressurisation line 35. The depressurisation line 35 opens in a tank volume 36.

Depending on the resulting force on the pressure limitation valve 32, a throttled connection is consequently produced between the control pressure supply line 25 and the depressurisation line 35. Consequently, a pressure drop is brought about at the throttle 29 with the result that there is an adjustable control pressure on the integrated valve 17 at the control pressure face 19 thereof.

During a braking operation, pressure medium is conveyed from the intake line 10 into the first store line portion 11 by the hydrostatic piston engine 9 in a manner which has been described above. The pressure in the store line portion 11 acts on the face 21 which can be acted on with pressure. At the same time, the pressure in the storage element 13 acts on the second face 22 which can be acted on with pressure. If the sum of the hydraulic forces produced in this manner is greater than the sum of the force of the valve spring 20 and the hydraulic force at the control pressure face 19 acting in the opposite direction, the integrated valve 17 is moved in the direction of the open position thereof and the storage element 13 is filled with pressure medium.

As the pressure in the storage element 13 increases, the hydraulic force at the second face 22 which can be acted on with pressure also increases. Consequently, the integrated valve 17 is moved further in the direction of the open position thereof so that the throttling action at the integrated valve 17 is reduced. Consequently, owing to the increasing opening of the integrated valve 17 and the resulting lower throttle effect between the sealing edge 23 and the sealing seat 24, the higher counter-pressure of the storage element 13 is taken into account. In a preferred configuration, the counter-pressure which is increasing owing to the pressure increase in the storage element 13 is compensated for in a precise manner by the decreasing throttling by the integrated valve 17. For a constant control pressure at the control pressure face 19, the vehicle is consequently subjected to a constant braking effect regardless of the respective charge state of the storage element 13.

The level of the respective control pressure is determined by a control signal which is supplied to the electromagnet 37 of the pressure limitation valve 32 via a signal line 39. The signal line 39 connects the electromagnet 37 to an electronic control unit 40. The electronic control unit 40 establishes a value for the control signal which is supplied to the electromagnet 37 via the signal line 39. As an input variable, the electronic control unit 40 uses at least the pressure signal of a pressure sensor 41. The pressure sensor 41 is connected to the electronic control unit 40 via a sensor line 46. In the first illustrated embodiment of FIG. 1, the pressure sensor 41 is arranged in the second store line portion 12. The measured pressure value which is supplied to the electronic control unit 40 consequently corresponds to the pressure in the storage element 13. Consequently, the system is controlled since it takes into account only the pressure in the storage element 13 but not the pressure produced at the supply side of the hydrostatic piston engine 9. As an additional input variable, it is possible to determine, for example, a desired value or a brake pedal position via an additional signal line 42.

In order to make the throttle valve unit 15 secure, a first safety valve 43 is provided in the control pressure valve unit 16 and connects the line 30 to the depressurisation line 35, as long as the control pressure exceeds a critical value determined by the safety valve 43.

A second safety valve 44 is connected to the second store line portion 12 and depressurises the store line portion into the tank volume 36, as long as a critical pressure value is exceeded in this instance. A third safety valve 45 is connected to the first store line portion 10 and depressurises this and consequently the supply side of the hydrostatic piston engine 9 into the tank volume 36 if a critical pressure value is exceeded in the first store line portion 11. As an alternative to the illustration with three safety valves 43-45, it is also possible to dispense with the safety valves 43 and 44. The securing is then carried out by means of the third safety valve 45. In the event of an inadmissibly high increase in the control pressure, the integrated valve 17 is moved into the closed position thereof. Consequently, the supply-side pressure increases in the first store line portion 11 which leads to the third safety valve 45 opening.

Figure 2:
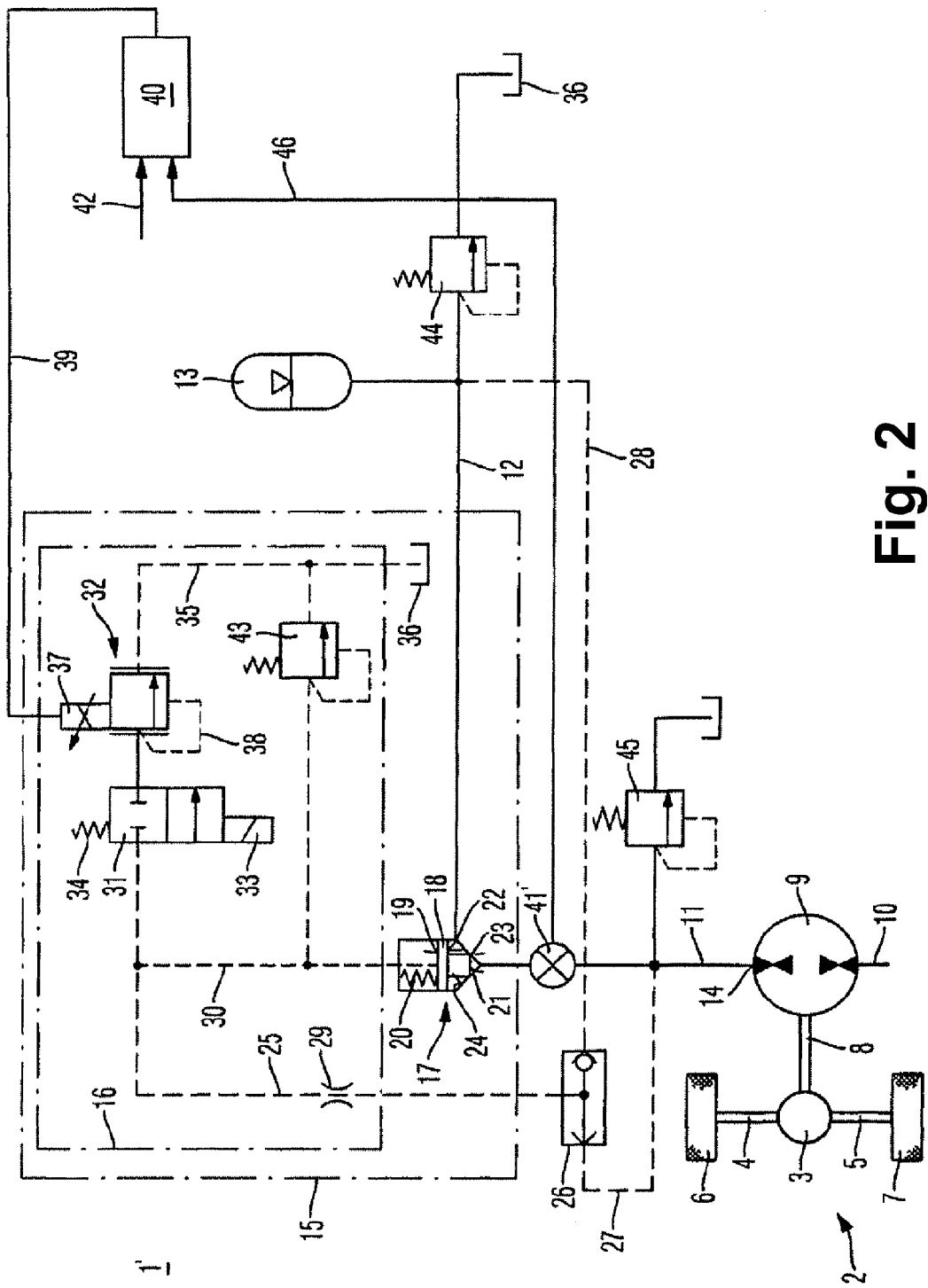
FIG. 2 is a second embodiment of a drive according to the invention.

FIG. 2 illustrates a second embodiment of the drive 1' according to the invention. The elements which correspond to the elements of FIG. 1 are given the same reference numerals. In order to prevent unnecessary repetition, this is not described again in its entirety.

In contrast to FIG. 1, a pressure sensor 41' is arranged in the first store line portion 10. Consequently, the pressure in the storage element 13 is not used as an input variable for the electronic control unit 40, but instead the pressure produced by the hydrostatic piston engine 9 in the first store line portion 11. In contrast to the control of the embodiment according to FIG. 1, the embodiment according to FIG. 2 involves an adjustment since the actual counter-pressure produced for the hydrostatic piston engine 9 is taken into account when establishing the control signal for the electromagnet 37 of the pressure limitation valve 32. Accordingly, owing to the new supply pressure of the hydrostatic piston engine 9, a correction of the control signal is brought about directly and is transmitted to the control signal line 39 by the electronic control unit 40.

The present invention is not limited to the embodiment illustrated. In particular, individual features of the embodiments illustrated can be combined with each other.

The invention claimed is:

1. A drive having an energy recovery function, comprising:
   a hydrostatic piston engine;
   at least one storage element which is connected to the hydrostatic piston engine; and
   a throttle valve unit which divides a store line into a first store line portion and a second store line portion, the throttle valve unit comprising a control pressure valve unit and an integrated valve on which a control pressure produced by the control pressure valve unit acts, wherein the control pressure is higher than the pressure of the at least one storage element.

2. The drive according to claim 1, wherein the integrated valve is acted on with the control pressure at a control pressure face and is acted on in the opposite direction with a supply pressure and a store pressure.

3. The drive according to claim 1, wherein the control pressure valve unit, to produce the control pressure, comprises a controllable pressure limitation valve, by means of which a control pressure supply line is connected to a tank volume.

4. The drive according to claim 3, wherein the control pressure supply line is connected to a supply-side connection of the hydrostatic piston engine by means of a throttle.

5. The drive according to claim 3, wherein the control pressure supply line is connected to the supply-side connection of the hydrostatic piston engine or to the storage element by a shuttle valve.

6. The drive according to claim 3, wherein a switching valve is provided in the control pressure supply line upstream of the pressure limitation valve.

7. The drive according to claim 3, wherein the pressure limitation valve is controlled electromagnetically and a control signal be produced by an electronic control unit.

8. The drive according to claim 7, wherein the control signal is established by the electronic control unit in accordance with a measured pressure value and a desired pressure value.

9. The drive according to claim 1, wherein the integrated valve is acted on in the closing direction by the control pressure and a resilient force acts in the same direction as the hydraulic force produced in this manner.

* * * * *